United States Patent [19]

Furuhashi

[11] Patent Number: 5,088,769
[45] Date of Patent: Feb. 18, 1992

[54] CONTROL APPARATUS OF PASSIVE SEAT BELT

[75] Inventor: Hiroshi Furuhashi, Shizuoka, Japan

[73] Assignee: Suzuki Jidosha Kogyo Kabushiki Kaisha, Shizouka, Japan

[21] Appl. No.: 534,461

[22] Filed: Jun. 7, 1990

[30] Foreign Application Priority Data

Jun. 30, 1989 [JP] Japan .................. 1-168706
Jun. 30, 1989 [JP] Japan .................. 1-168707
Jul. 11, 1989 [JP] Japan .................. 1-178234

[51] Int. Cl.⁵ ............................. B60R 22/08
[52] U.S. Cl. .......................... 280/803; 180/268
[58] Field of Search ........... 280/802, 803, 804, 806, 280/807; 242/107.4 A; 180/268

[56] References Cited

U.S. PATENT DOCUMENTS

| 4,040,645 | 8/1977 | Giffen | 280/803 |
| 4,235,455 | 11/1980 | Collins | 280/803 |
| 4,703,950 | 11/1987 | Pickett | 242/107.4 A |
| 4,779,700 | 10/1988 | Kataoka | 280/804 |
| 4,796,916 | 1/1989 | Rogers et al. | 280/803 |

FOREIGN PATENT DOCUMENTS 57-33186 7/1982 Japan .
58-36745 3/1983 Japan .................. 180/268

Primary Examiner—Charles A. Marmor
Assistant Examiner—Karin Tyson
Attorney, Agent, or Firm—Flynn, Thiel, Boutell & Tanis

[57] ABSTRACT

A passive seat belt control apparatus includes a retractor for housing part of a seat belt. The retractor includes an arrangement for sensing acceleration and deceleration of a vehicle door and the speed at which the seat belt is pulled out from the retractor, and a mechanism for locking the seat belt. A solenoid operates to cancel the function of the retractor, and a door switch detects opening and closing of the vehicle door. A main control unit actuates the solenoid when the door switch detects that the door is open, and the main control unit includes an arrangement for continuously maintaining the solenoid operative for a predetermined time whenever the door switch detects that the door is closed after it has previously detected that the door is open.

3 Claims, 2 Drawing Sheets

CONTROL APPARATUS OF PASSIVE SEAT BELT

FIELD OF THE INVENTION

The present invention relates to a control apparatus of a passive seat belt and, more particularly, to a control apparatus of a passive seat belt of what is called a door mounting type in which a passenger on the seat is automatically released or restricted in accordance with the opening/closure of a vehicle door.

BACKGROUND OF THE INVENTION

The passive seat belt apparatus of the door mounting type in which the attachment and release of the belt are automatically executed in accordance with the opening/closure of the door of a vehicle has an advantage in that the seat belt is semiforcedly attached without needing any troublesome operation and the attachment of the seat belt is recommended.

As such a kind of seat belt apparatus, there is a known apparatus in which a retractor is attached in the lower rear portion open side of the door, wherein the retractor has a wind-out rotation emergency locking function such that, ordinarily, a belt edge portion is elastically wound and a proper tension is applied to the belt, and the belt can be easily pulled out as necessary, and when a sudden acceleration or deceleration occurs in the vehicle and when the belt is suddenly pulled out such as in the case of a collision or the like, the acceleration/deceleration of the vehicle and the pulling-out of the belt are sensed and the belt is locked. In the case of a structure in which the retractor is installed in the door, there is concern that the belt may be locked when the door is suddenly opened due to the pulling-out speed of the belt and the acceleration/deceleration of the door itself when the door is opened or closed. Therefore, for instance, as shown in the invention disclosed in JP-B-57-33186, for example, there is known a structure such that the emergency locking function is made operative (by the retractor and a door switch which is attached near the lower portion of a center pillar of the vehicle) only when the door is closed, and when the door is open, the emergency locking function of the belt is cancelled, thereby preventing locking of the belt. Generally, the emergency locking function is cancelled by using a belt lock cancelling solenoid provided in the retractor.

In the apparatus disclosed in JP-B-57-33186 and other conventional examples, it is surely possible to effectively avoid unnecessary locking of the belt when the door is open. However, in the emergency lock of the belt, "LOCK" and "UNLOCK" are ordinarily controlled in accordance with a value of an output of a G sensor (acceleration sensor) provided in the retractor. Therefore, there is a case where the belt is locked by an instantaneous high shock value when the door is closed. Thus, there is an inconvenience in that the belt is locked before the passenger fastens the belt.

Accordingly, it is an object of the invention to provide a control apparatus of a passive seat belt which can effectively avoid unnecessary actuation of the emergency locking function of the belt due to a shock when the vehicle door is closed.

The door switch in the above conventional examples is, in many cases, also commonly used to switch a courtesy light. However, the structure of the door switch is frequently such that, when the door is closed, the movable contact is pressed away from the fixed contact against an original position return spring, thereby opening the switch. That is, the switch senses the pressing force of the door. Therefore, when the door is closed and retained to the vehicle body, but not fully positively latched thereto, the ON/OFF state of the door switch is obscure and, in many cases, the door switch is set to ON, indicating the door is open. Therefore, although in many cases a main courtesy light switch is turned OFF in the daytime, if the driver intends to drive the vehicle with the door in such a closed but incompletely latched state, there is an inconvenience in that the belt lock cancelling solenoid operates, cancelling the emergency locking function of the belt.

It is therefore another object of the present invention to provide a passive seat belt apparatus which can effectively prevent cancellation of the emergency locking function of the belt when the door is closed but not completely latched.

Also in the above conventional examples, there is used a structure in which the belt lock function is prevented by driving the belt lock cancelling solenoid through a relay whose contact is closed by the turn-on of the door switch or a controller which detects the ON signal of the door switch. Therefore, there are inconveniences when the relay or controller malfunctions due to noises or the like from the outside, and even in the case where the belt locking function must not inherently be cancelled, the belt lock cancelling solenoid operates.

It is therefore another object of the invention to provide a control apparatus of a passive seat belt in which it is possible to effectively prevent the belt lock cancelling solenoid from erroneously operating in response to noises and the like from the outside.

In an embodiment of the present invention, there is provided a control apparatus having a belt lock cancelling solenoid to cancel a wind-out rotation emergency stop function of a retractor having the wind-out rotation emergency stop function for sensing an acceleration/deceleration of the vehicle and a pulling-out speed of the belt and for locking the belt; a door switch to detect the opening/closure of the door; and a main control unit for making the belt lock cancelling solenoid operative in the case where the door switch detects that the door is open. The main control unit also has a control function to continuously maintain the belt lock cancelling solenoid operative for a predetermined time even after the door is closed, that is, in the case where the door switch detects the door closing state after it detected the door opening state.

In a variation, the control apparatus also includes a door lock switch to detect the opening/closure of the door by sensing whether the door has been retained to the vehicle body, which switch is provided in a latch which retains the door to the vehicle body. The main control unit makes the belt lock cancelling solenoid operative only when both of the switches have sensed that the door is open.

In the invention, the door switch preferably comprises a normally closed type contact which is opened when the door is closed and is closed when the door is open, the door switch being connected to the belt lock cancelling solenoid and forming a part of a current supplying circuit of the solenoid.

BRIEF DESCRIPTION OF THE DRAWINGS

The present invention will be described hereinbelow on the basis of FIGS. 1 to 3, in which.

DETAILED DESCRIPTION

Figure 3:
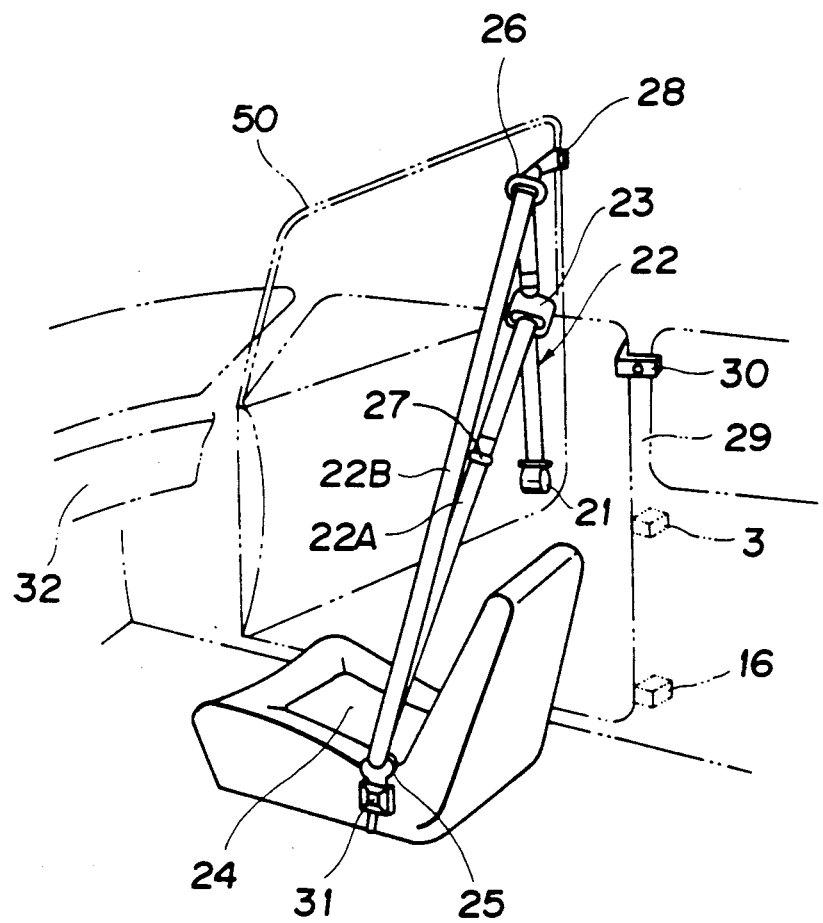
FIG. 3 is an explanatory diagram showing an external view of an apparatus having the circuit of FIG. 1.

In an embodiment, as shown in FIG. 3, a retractor 21 to wind and enclose a belt is attached to the lower interior portion of a door 50. Ordinarily, the retractor 21 elastically winds in one end portion of a belt 22 and applies a moderate yieldable tension to the belt 22 permitting one to easily pull out the belt as necessary. The retractor 21 has a wind-out rotation emergency stop (or lock) function such that when a sudden acceleration/deceleration occurs to the vehicle and when the belt 22 is suddenly pulled out upon collision or the like, the acceleration/deceleration of the vehicle and the pulling-out speed of the belt 22 are sensed and the belt 22 is locked.

One end portion of the belt 22 is wound into the retractor 21 and the other end passes through a coupling ring 23 shown in FIG. 3 and crosses over a seat 24 and passes through an annular retaining member 25 and is folded back. After that the belt extends in the oblique upward direction in the diagram and passes through a slip anchor 26 and extends downwardly and is fixed to the coupling ring 23 mentioned above.

The annular retaining member 25 is detachably engaged with a buckle 31 which is mounted to the side of the seat 24 and attached to the vehicle floor or frame. On the other hand, a stopper 27 is provided in the portion of the belt 22 between the coupling ring 23 and the annular retaining member 25. The stopper 27 functions to convey the coupling ring 23 toward the retractor 21 when the door 50 is closed, that is, when the belt 22 is installed.

The slip anchor 26 is attached to a sash bracket 28 fixed to the upper interior portion of the door 50 adjacent the rear edge thereof, which bracket 28 and slip anchor 26 provide a fulcrum (support) for the belt 22. When the door 50 is closed, the sash bracket 28 comes into detachable engagement with a pillar anchor 30 provided on a center pillar 29 of the vehicle, thereby providing a structure such that the attaching strength of the slip anchor 26 is enhanced. A coefficient of sliding friction between the belt 22 and the annular retaining member 25 is set to be larger than friction coefficients between the belt 22 and the coupling ring 23, or the slip anchor 26.

A lap belt portion 22A and a shoulder belt portion 22B are formed by the single continuous belt 22 which extends from the retractor 21 and terminates at the coupling ring 23. The belt 22 is automatically installed and released in accordance with the opening/closure of the door 50.

Although only the right side (passenger's seat side) of the vehicle has been described above for convenience of explanation, since the seat belt apparatus provided on the opposite (driver) side seat is similar, an explanation including both of them will now be made hereinbelow.

The construction and operation of a main circuit section of the embodiment will now be described on the basis of FIGS. 1 and 2.

In the following description, the driver's side is abbreviated "Dr" and the passenger's side is abbreviated "Ps" for convenience of explanation.

Figure 1:
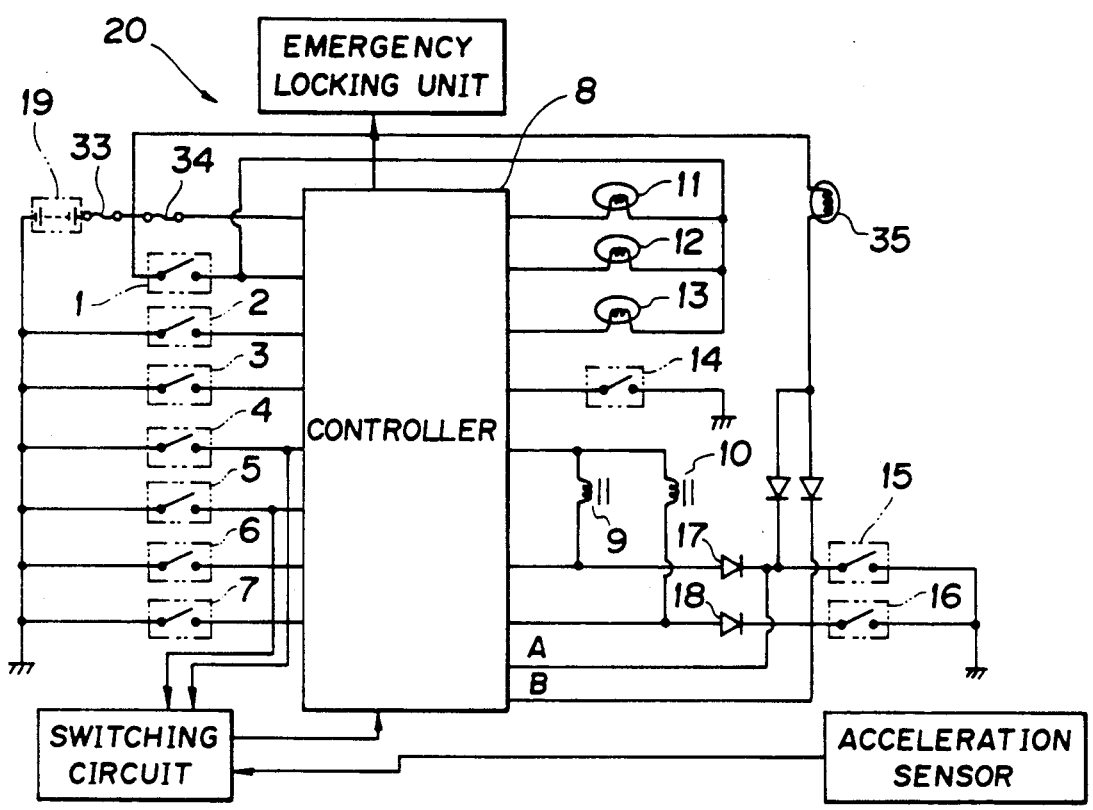
FIG. 1 is a block diagram showing a construction of a main circuit section of an embodiment of the present invention.

A circuit 20 shown in FIG. 1 comprises an ignition switch 1; a Dr door lock switch 2; a Ps door lock switch 3; a Dr solenoid switch 4; a Ps solenoid switch 5; a Dr buckle switch 6; a Ps buckle switch 7; and a controller 8 as a main control unit to which the above switches are connected.

Among them, as shown in FIG. 3, the Ps door lock switch 3 is actually provided in the latch (not shown) which retains the door 50 on the passenger's seat side to the vehicle body, and detects the opening/closure of the door 50 by sensing whether the door 50 has been retained to the vehicle body. When the door 50 on the passenger's seat side is retained to the vehicle body, the contact of the Ps door lock switch 3 is opened. When the door 50 is not retained to the vehicle body, the contact of the switch 3 is closed. The Dr door lock switch 2 is provided at almost the same position on the driver's seat side and has the same function as the Ps door lock switch 3.

The Ps solenoid switch 5 is constructed as a known kind of relay together with a Ps cancel solenoid 10, which will be explained later, and has a structure such that when the Ps cancel solenoid 10 operates, a movable contact of the Ps solenoid switch 5 is attracted and switch 5 is thereby opened. On the other hand, the Ps solenoid switch 5 is connected to the output side of a conventional acceleration sensor installed in the retractor 21, and turns ON/OFF a conventional switching circuit to transmit an output signal of the acceleration sensor to the controller 8. In the embodiment, when an output value of the acceleration sensor exceeds a predetermined value, the controller 8 actuates a conventional belt emergency locking unit in the retractor 21, so that the foregoing wind-out rotation emergency stop is executed and the belt 22 is emergency-locked. The Dr solenoid switch 4 is constructed as a kind of relay together with a Dr cancel solenoid 9, which will be explained later, and has the same function as the Ps solenoid switch 5.

The Ps buckle switch 7 is provided for the buckle 31 mentioned above. When the belt 22 on the passenger's seat side is installed in the buckle 31, a contact of the switch 7 is opened. When the belt 22 is not installed, the contact is closed. The controller 8 controls the "light on/off" operation of a Ps belt lamp 13, which will be explained later, in accordance with the "ON/OFF" state of the Ps buckle switch 7. The Dr buckle switch 6 is installed on a buckle on the driver's seat side (not shown) and has the same function as the Ps buckle switch 7.

The controller 8 has therein a conventional microcomputer-based circuit and controls the whole circuit 20. A door warning lamp 11, a Dr belt lamp 12, the ps belt lamp 13, and a warning check switch 14 are connected to the controller 8. The above lamps are actually attached to a front panel 32 of the vehicle, as shown in FIG. 3. Among them, the door warning lamp 11 is lit to warn vehicle occupants of a partially open door when either one of a Dr door switch 15 and a Ps door switch 16, which will be explained later, is set to "ON". When the Dr buckle switch 6 and Ps buckle switch 7 mentioned above are set to "ON", the Dr belt lamp 12 and Ps belt lamp 13 are lit by the controller 8, thereby informing the occupants that the seat belt must be fastened or that the seat belt is not correctly fastened to the buckle. When a starter signal is input, the warning check switch 14 is set to "ON" and is used to check whether various warning lamps such as door warning lamp 11 and the like correctly operate or not.

Further, the controller 8 is connected to the Dr cancel solenoid 9 as a belt lock cancelling solenoid to cancel the wind-out rotation emergency stop function of the driver side retractor (not shown); and the Ps cancel solenoid 10 to cancel the wind-out rotation emergency stop function of the passenger side retractor 21. The Ps cancel solenoid 10 is provided in the retractor 21 shown in FIG. 3. When the above Ps solenoid switch 5 is opened, the switching circuit causes the output signal from the acceleration sensor to be set to zero, whereby the controller 8 does not actuate the emergency locking unit.

Further, in the embodiment, the Dr door switch 15 and Ps door switch 16 are respectively serially connected to the Dr cancel solenoid 9 and Ps cancel solenoid 10 through reverse-stop diodes 17 and 18, respectively. The other ends of the Dr door switch 15 and Ps door switch 16 are connected to ground and constitute parts of current supplying circuits of the Dr cancel solenoid 9 and Ps cancel solenoid 10, respectively. As shown in FIG. 3, the Ps door switch 16 is installed in the lower portion of the vehicle body behind the door 50 on the passenger's seat side and adjacent the rear edge of the opening for the door. The switch 16 is used to detect the opening/closure of the door 50. The Ps door switch 16 comprises what is called a normally ON (closed) type switch and has a structure such that when the door 50 is closed, the movable contact is pressed away from the fixed contact by the door 50 against an original position return spring, whereby switch 16 is opened. The Dr door switch 15 is installed at almost the same position on the driver's seat side (not shown) as that mentioned above and has the same function as the Ps door switch 16. In a manner similar to the ordinary case, the Dr door switch 15 and Ps door switch 16 also function as "ON/OFF" switches for vehicle courtesy lights (not shown).

As mentioned above, the Dr door switch 15 is serially connected to the Dr cancel solenoid 9 and the other end is connected to ground and constitutes a part of the current supplying circuit of the solenoid 9. The Ps door switch 16 is serially connected to the Ps cancel solenoid 10 and the other end is connected to ground and constitutes a part of the current supplying circuit of the solenoid 10. Therefore, even if the controller 8 tried to erroneously make the Dr cancel solenoid 9 (or Ps cancel solenoid 10) operative due to an influence by noises from the outside (for example, electromagnetic interference), if the Dr door switch 15 (or Ps door switch 16) is set to OFF, since the current supplying circuit is open, the Dr cancel solenoid 9 (or Ps cancel solenoid 10) does not operate.

In FIG. 1, reference numeral 19 denotes a battery as a power source. Reference numerals 33 and 34 indicate fuses and 35 denotes an ignition marker lamp.

The operation of the circuit 20 will now be described.

When the ignition switch 1 is turned "ON" and a starter motor is driven, the warning lamp check switch 14 is turned "ON" and the lamps 11 to 13 such as door warning lamp 11 are lit. With the start of the engine, the warning lamp check switch 14 is turned "OFF", so that the lamps 11 to 14 are turned off. At this time, since the engine has already been started, the ignition marker lamp 35 is held in the light-on state.

In this case, if either one of the door switches 15 or 16 is turned "ON", that is, when the door is open, since the input level at point A or point B in FIG. 1 is set to "low (L)", the controller 8 detects it and lights the door warning lamp 11. Due to this, the occupants are warned of the partially open door. On the other hand, at this time, if the Dr buckle switch 6 (or Ps buckle switch 7) is "ON", that is, if the belt 22 is not correctly installed in the buckle 31, the controller 8 detects such a state and lights the Dr belt lamp 12 (or Ps belt lamp 13). Thus, the occupants are alerted that the seat belt is not correctly installed. When the belt 22 is correctly installed in the buckle 31, the Dr buckle switch 6 (or Ps buckle switch 7) is turned "OFF", so that the controller 8 turns off the Dr belt lamp 12 (or Ps belt lamp 13).

Figure 2:
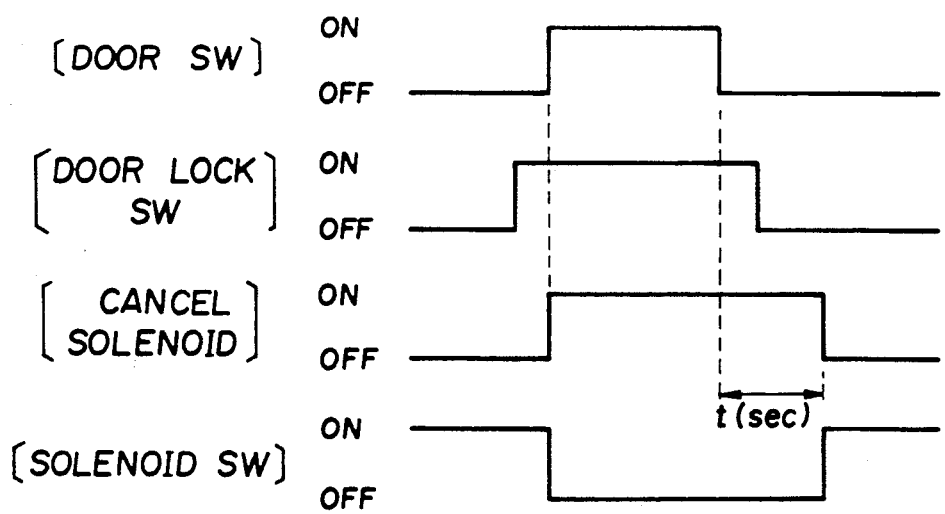
FIG. 2 is a timing chart for explaining the main control function of the circuit of FIG. 1.

Next, upon exiting the vehicle, when it is necessary to cancel the emergency locking function of the belt, even if the door on the driver's side is suddenly opened and the belt 22 is suddenly pulled out from the retractor 21, since both of the Dr door switch 15 and the Dr door lock switch 2 have been set to "ON", the controller drives the Dr cancel solenoid 9 and turns "OFF" the Dr solenoid switch 4 (refer to FIG. 2). Therefore, as mentioned above, the output of the acceleration sensor is set to zero and the emergency locking function of the seat belt is cancelled. The same also applies to the passenger side.

In the case where the driver operates the vehicle with the door closed and retained to the vehicle body but not fully positively latched, and either the door warning lamp 11 is not lit or the driver is for some reason not aware that the door warning lamp 11 is lit, even though the corresponding door switch 15 or 16 may be ON, the contacts of the corresponding one of the Dr door lock switch 2 and Ps door lock switch 3 are set to OFF. Therefore, the controller 8 does not make the corresponding cancel solenoid 9 or 10 operative. Thus, the signal from the acceleration sensor is sent to the controller 8 and is not set to zero, and when the signal value exceeds a predetermined value, that is, in the case where the emergency lock is necessary upon collision or the like, the controller 8 makes the emergency locking unit operative to execute the wind-out rotation emergency stop of the retractor 21.

When the driver runs the vehicle after all of the warning lamps were turned off after the door had been closed again, even in the case where a controller malfunction occurs due to noises and the like from the outside and the controller tries to make the Dr cancel solenoid 9 operative, the Dr door switch 15 (and Dr door lock switch 2) is set to OFF so that no current is supplied to the Dr cancel solenoid 9. Therefore, the signal from the acceleration sensor is sent to the controller 8 and is not set to zero, and when the value exceeds a predetermined value, that is, if the emergency lock upon collision or the like is necessary, the controller 8 makes the emergency locking means operative and can execute the wind-out rotation emergency stop of the retractor 21.

Further, when the driver opens the door from the outside of the vehicle in order to ride therein, the emergency locking function of the belt is cancelled in a manner similar to the above case. However, when the door is closed after the driver has entered the vehicle, the Dr door switch 15 is turned "OFF" and the input level at point A in FIG. 1 is changed from low to high, so that the controller 8 detects it and operates to continuously maintain the Dr cancel solenoid 9 operative for a predetermined time (t seconds) from that time point. Thus, the Dr solenoid switch 4 is continuously held in the open state. The same shall also apply to the passenger side. FIG. 2 shows the timing relationship among the door switch 15 (or 16) at that time, the door lock switch 2 (or 3), the cancel solenoid 9 (or 10), and the solenoid switch 4 (or 5). As will be obvious from FIG. 2, the cancel solenoid 9 (or 10) is controlled by the controller 8 in a manner such that it is turned "ON" (operative mode) when both of the door switch 15 switch (or 16) and the door lock switch 2 (or 3) are set to "ON" and that it is turned "OFF" t seconds after the door 15 (or 16) was turned "OFF". Note that, if desired, the cancel solenoids 9 and 10 may also be turned OFF a predetermined time after door lock switch 2 and switch 3 are respectively turned OFF.

On the other hand, upon running or the like, since all of the Dr door lock switch 2, Ps door lock switch 3, Dr door switch 15, and Ps door switch 16 are set to "OFF", the controller 8 does not drive the Dr cancel solenoid 9 or Ps cancel solenoid 10. Therefore, there is an advantage in that the present invention effectively avoids the danger of cancelling the emergency belt lock function during vehicle travel, when such function is desired.

Since the present invention is constructed and functions as mentioned above, it is possible to provide an excellent passive seat belt control apparatus which is not obtained hitherto, and with which: (1) it is possible to effectively avoid actuation of the emergency locking function of the belt due to a shock upon closing of the door, so that the belt can be smoothly fastened; (2) it is possible to effectively prevent the emergency locking function of the belt from being cancelled upon driving with the door closed but not fully positively latched; and (3) it is possible to effectively prevent the wind-out rotation emergency stop function of the retractor from being cancelled as a result of malfunctions due to external interference.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a vehicle passive seat belt apparatus including a seat belt, a retractor for housing part of the seat belt, said retractor including means for permitting withdrawal of said seat belt therefrom and means for retracting said seat belt thereinto, sensing means for sensing acceleration of a door of the vehicle and for sensing withdrawal of the seat belt from the retractor, emergency bolt locking means responsive to said sensing means for selectively locking said seat belt against withdrawal from said retractor, and a belt lock cancelling solenoid which selectively prevents operation of said emergency belt lock means in response to opening and closing of the vehicle door, the improvement comprising:

a door switch means provided adjacent an opening edge of the vehicle door for detecting the opening and closing of the vehicle door, a releasable latch mechanism for positively retaining the vehicle door latched in a closed position, said latch mechanism having latch switch means provided therein for detecting whether the vehicle door has been positively latched in said closed position by said latch mechanism, and control means responsive to said door switch means and said latch switch means for effecting actuation of the belt lock cancelling solenoid only when both said door switch means and said latch switch means have detected that the door is open, said control means including delay means for maintaining the actuation of said solenoid for a predetermined period of time immediately after one of said door switch means and said latch switch means has detected that the vehicle door is closed, each of said door switch means and said latch switch means including an electrical switch having respective open and closed positions, said control means including electric current supply means for selectively supplying electric current for actuation of said solenoid, one of said electrical switches being arranged in series circuit with said electric current supply means and said solenoid for permitting electric current from said electric current supply means to flow through said solenoid when said one electrical switch is in said closed position, and said one electrical switch coacting with the vehicle door to be switched into said open position whenever the vehicle door is closed, thereby electrically preventing erroneous actuation of said solenoid while the vehicle door is closed.

2. A vehicle passive seat belt apparatus according to claim 1, wherein said retractor is mounted on a lower portion of the vehicle door, said seat belt having a retaining member provided thereon which is adapted to be removably attached to the vehicle at a location spaced sidewardly from said retractor when said seat belt is in use, a ringlike support anchor attached to the vehicle door above said retractor, said seat belt, when in use, having a lap belt portion which extends between said retractor and said retaining member, a shoulder belt portion which extends generally upwardly and sidewardly from said retaining member to said support anchor, and a distal end portion which passes slidably through said support anchor and extends generally downwardly therefrom toward said retractor, a freely floating coupling ring attached to said distal end portion and disposed generally vertically between said retractor and said support anchor, said lap belt portion extending generally upwardly from said retractor and passing slidably through said coupling ring closely adjacent said distal end portion as attached thereto, said lap belt portion extending generally sidewardly from said coupling ring to said retaining member, said seat belt having a one-piece unitary structure, said retaining member having an annular structure, said seat belt passing through said retaining member and being folded back toward itself around said retaining member, and said one-piece seat belt extending continuously from said retractor through said coupling ring, thence through said retaining member, thence through said support anchor, and terminating at said coupling ring, and said lap belt portion having a stopper provided thereon between said coupling ring and said retaining member for carrying said coupling ring toward said retractor during normal retraction of said seat belt immediately prior to use, said stopper being sufficiently large to prevent passage thereof through said coupling ring during said normal seat belt retraction.

3. In a vehicle passive seat belt apparatus including a seat belt, a retractor for housing part of the seat belt, said retractor including means for permitting withdrawal of said seat belt therefrom and means for retracting said seat belt thereinto, sensing means for sensing acceleration of a door of the vehicle and for sensing withdrawal of the seat belt from the retractor, emergency belt locking means responsive to said sensing means for selectively locking said seat belt against withdrawal from said retractor, and a belt lock cancelling solenoid which selectively prevents operation of said emergency belt lock means in response to opening and closing of the vehicle door, the improvement comprising:

a door switch means provided adjacent an opening edge of the vehicle door for detecting the opening and closing of the vehicle door, a releasable latch mechanism for positively retaining the vehicle door latched in a closed position, said latch mechanism having latch switch means provided therein for detecting whether the vehicle door has been positively latched in said closed position by said latch mechanism, and control means responsive to said door switch means and said latch switch means for effecting actuation of the belt lock cancelling solenoid only when both said door switch means and said latch switch means have detected that the door is open, each of said door switch means and said latch switch means including an electrical switch having respective open and closed positions, said control means including electric current supply means for selectively supplying electric current for actuation of said solenoid, one of said electrical switches being arranged in series circuit with said electric current supply means and said solenoid for permitting electric current from said electric current supply means to flow through said solenoid when said one electrical switch is in said closed position, and said one electrical switch co-acting with the vehicle door to be switched into said open position whenever the vehicle door is closed, thereby electrically preventing erroneous actuation of said solenoid while the vehicle door is closed.

* * * * *

UNITED STATES PATENT AND TRADEMARK OFFICE
CERTIFICATE OF CORRECTION

PATENT NO. : 5 088 769

DATED : February 18, 1992

INVENTOR(S) : Hiroshi Furuhashi

It is certified that error appears in the above-identified patent and that said Letters Patent is hereby corrected as shown below:

Column 7, line 55; change "bolt" to ---belt---.

Signed and Sealed this

Twenty-ninth Day of June, 1993

Attest:

MICHAEL K. KIRK

*Attesting Officer*   Acting Commissioner of Patents and Trademarks